(12) United States Patent
Tesavis

(10) Patent No.: US 6,278,531 B1
(45) Date of Patent: Aug. 21, 2001

(54) IMAGE HANDLING METHOD AND SYSTEM

(75) Inventor: Carl Joseph Tesavis, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/598,344

(22) Filed: Jun. 21, 2000

Related U.S. Application Data

(63) Continuation of application No. 08/710,275, filed on Sep. 16, 1996, now Pat. No. 6,108,104.

(51) Int. Cl.[7] .................................................... H04N 1/00
(52) U.S. Cl. .......................... 358/434; 358/405; 358/407; 358/408
(58) Field of Search .................................. 358/400, 401, 358/405, 406, 434, 435, 438, 440, 444, 468, 487, 408, 407, 436, 1.14, 1.15; 379/100.06, 100.09, 102.02

(56) References Cited

U.S. PATENT DOCUMENTS

| | | | |
|---|---|---|---|
| 3,402,488 | 9/1968 | Leavitt | 40/2.2 |
| 3,478,162 | 11/1969 | Banning, Jr. | 178/5.6 |
| 4,508,438 | 4/1985 | Kanaoka et al. | 354/105 |
| 4,519,701 | 5/1985 | Kanoaka et al. | 355/39 |
| 4,532,554 | 7/1985 | Skala | 358/257 |
| 4,574,692 | 3/1986 | Wahli | 101/2 |
| 4,631,599 | 12/1986 | Cawkell | 358/285 |
| 4,746,207 | 5/1988 | Selin | 352/90 |
| 4,760,574 | 7/1988 | Budworth et al. | 371/5 |
| 4,779,122 | 10/1988 | Signoretto | 355/77 |
| 4,817,023 | 3/1989 | Yamaguchi et al. | 364/525 |
| 4,823,162 | 4/1989 | Renn et al. | 355/40 |
| 4,920,432 | 4/1990 | Eggers et al. | 360/33.1 |
| 4,924,303 | 5/1990 | Brandon et al. | 358/86 |
| 4,928,168 | 5/1990 | Iwashita | 358/84 |
| 4,929,972 | 5/1990 | Anderson et al. | 354/75 |

(List continued on next page.)

FOREIGN PATENT DOCUMENTS

| | | | |
|---|---|---|---|
| 3 644-630 | 12/1986 | (DE) . | |
| 0363849 | * 4/1990 | (EP) | G03B/17/24 |
| 0 428 254 A2 | 9/1990 | (EP) | H04L/12/24 |
| 0 626 776 A1 | 5/1994 | (EP) | H04N/1/32 |
| 617 563 | 9/1994 | (EP) . | |
| 2529-739 | 1/1984 | (FR) . | |
| 2 100 490 | 12/1982 | (GB) . | |
| 404 070 731 | 3/1992 | (JP) . | |
| 90/04202 | 4/1990 | (WO) . | |
| 90/04203 | 4/1990 | (WO) . | |
| 90/04205 | 4/1990 | (WO) . | |
| 90/04215 | 4/1990 | (WO) . | |
| WO 91/07724 | 5/1991 | (WO) | G06F/15/21 |
| 93/16557 | 8/1993 | (WO) . | |

OTHER PUBLICATIONS

"Picture Web Preview" Aug. 28, 1986 16 pages from HTTP://WWW.PICTUREWEB.COM/ and HTTP://WWW-.PICTUREPLACE.COM/.

Fax Master 21 –User Handbook; Remote Operation; pp. 1–6–1–65, 1992.

Facsimile Handbook; McDonnell; pp. 47–48, 1992.

Primary Examiner—Jerome Grant, II
(74) Attorney, Agent, or Firm—James D. Leimbach; Peyton C. Watkins

(57) ABSTRACT

An image handling method and system for executing the method wherein hardcopy images are scanned at a scanner station, to obtain a corresponding set of digital image signals. Each of the digital sets of image signals is assigned an associated unique identification. The digital signal sets and their associated identification are communicated to a hub station which is remote from the scanner station, and then forwarded to a terminal which is remote from both the hub station and the scanning station via a route independent of the hub station. Storage for the communicated image set signals and associated identification are provided at the hub station.

15 Claims, 4 Drawing Sheets

U.S. PATENT DOCUMENTS

| | | | |
|---|---|---|---|
| 4,943,994 | 7/1990 | Ohtsuka et al. | 379/53 |
| 4,965,626 | 10/1990 | Robison et al. | 355/40 |
| 4,965,627 | 10/1990 | Robison et al. | 355/40 |
| 4,977,419 | 12/1990 | Wash et al. | 354/76 |
| 4,985,911 | 1/1991 | Emmons et al. | 379/53 |
| 4,994,926 | 2/1991 | Gordon | 358/400 |
| 4,996,546 | 2/1991 | Pagano et al. | 354/76 |
| 5,005,031 | 4/1991 | Kelbe | 354/106 |
| 5,021,820 | 6/1991 | Robison et al. | 35/40 |
| 5,028,940 | 7/1991 | Pearson | 354/75 |
| 5,034,836 | 7/1991 | DeMarti, Jr. et al. | 360/104 |
| 5,080,479 | 1/1992 | Rosenberg | 352/92 |
| 5,083,153 | 1/1992 | DeMarti, Jr. et al. | 355/40 |
| 5,113,208 | 5/1992 | Stoneham et al. | 354/105 |
| 5,126,540 | 6/1992 | Kashigagi et al. | 235/375 |
| 5,130,745 | 7/1992 | Cloutier et al. | 355/40 |
| 5,132,715 | 7/1992 | Taillie | 354/105 |
| 5,159,385 | 10/1992 | Imamura | 355/28 |
| 5,160,952 | 11/1992 | Iwashita et al. | 354/76 |
| 5,173,731 | 12/1992 | Yahara | 355/40 |
| 5,179,651 | 1/1993 | Taaffe et al. | 395/154 |
| 5,182,635 | 1/1993 | Nakashima et al. | 358/12 |
| 5,194,892 | 3/1993 | Robison | 355/40 |
| 5,198,899 | 3/1993 | Cang | 358/86 |
| 5,229,810 | 7/1993 | Cloutier et al. | 355/40 |
| 5,235,680 | 8/1993 | Bijnagte | 395/161 |
| 5,253,275 | 10/1993 | Yurt et al. | 375/122 |
| 5,264,683 | 11/1993 | Yoshikawa | 235/275 |
| 5,272,549 | 12/1993 | McDonald | 358/527 |
| 5,281,993 | 1/1994 | Croshetierre et al. | 355/40 |
| 5,289,239 | 2/1994 | Hosoya et al. | 355/50 |
| 5,313,237 | 5/1994 | Kammerer | 354/106 |
| 5,321,816 | 6/1994 | Rogan et al. | 395/200 |
| 5,327,265 | 7/1994 | McDonald | 358/527 |
| 5,336,873 | 8/1994 | Imamura | 235/462 |
| 5,341,474 | 8/1994 | Gelman et al. | 395/200 |
| 5,344,730 | 9/1994 | Kitamoto | 430/14 |
| 5,347,305 | 9/1994 | Bush et al. | 348/14 |
| 5,363,138 | 11/1994 | Hayashi et al. | 348/390 |
| 5,371,532 | 12/1994 | Gelman et al. | 348/7 |
| 5,383,027 | 1/1995 | Harvey et al. | 358/296 |
| 5,408,261 | 4/1995 | Kamata et al. | 348/15 |
| 5,410,343 | 4/1995 | Coddington et al. | 348/7 |
| 5,414,455 | 5/1995 | Hooper et al. | 348/7 |
| 5,428,423 | 6/1995 | Clark | 355/77 |
| 5,428,606 | 6/1995 | Moskowitz | 370/60 |
| 5,428,747 | 6/1995 | Kitamoto | 395/275 |
| 5,450,123 | 9/1995 | Smith | 348/17 |
| 5,451,998 | 9/1995 | Hamrick | 348/13 |
| 5,469,353 | 11/1995 | Pinsky et al. | 364/413 |
| 5,477,353 | 12/1995 | Yamasaki | 358/487 |
| 5,493,408 | 2/1996 | Kurogane et al. | 358/296 |
| 5,502,576 | 3/1996 | Ramsay et al. | 358/444 |
| 5,508,783 | 4/1996 | Iwagaki et al. | 3535/40 |
| 5,512,396 | 4/1996 | Hicks | 430/21 |
| 5,523,781 | 6/1996 | Brusaw | 348/3 |
| 5,528,281 | 6/1996 | Grady et al. | 348/7 |
| 5,528,492 | 6/1996 | Fukushima | 364/419 |
| 5,539,452 | 7/1996 | Bush et al. | 348/17 |
| 5,539,735 | 7/1996 | Moskowitz | 370/60 |
| 5,563,724 | 10/1996 | Boll et al. | 358/502 |
| 5,585,854 | 12/1996 | Makino | 358/407 |
| 5,629,780 | 5/1997 | Watson | 358/539 |
| 5,760,916 | 6/1998 | Dellert et al. | 358/408 |

\* cited by examiner

IMAGE HANDLING METHOD AND SYSTEM

CROSS-REFERENCE TO RELATED APPLICATIONS

This is a continuation application of U.S. Ser. No. 08/710,275, filed Sep. 16, 1996 (CPA filing date), by Carl J. Tesavis, and entitled "Image Handling Method And System," now U.S. Pat. No. 6,108,104.

FIELD OF THE INVENTION

This invention relates generally to the field of photography and image signals obtained from photographs. More particularly, the present invention relates to a system and method by which image signals corresponding to hardcopy photographs, can be readily traced, and retrieved and distributed as desired by a user.

BACKGROUND OF THE INVENTION

In conventional photography, a user exposes a photographic film in a camera and conveys (either personally, by mail, or some other delivery service) the exposed film to any convenient processing center. The processing center then processes the film to form the hardcopy images (typically in the form of photographic negatives on the original film and/or photographic prints, or photographic positives in the case of reversal processed film). The hardcopy images are then conveyed back to the user (often by the user personally picking them up at the processing center). If a user desires to share the images with others without giving up their own hardcopies, they typically go through the highly tedious and time consuming effort of designating which hardcopy images are desired to be shared, returning the designated hardcopy images to the processor to produce further hardcopies, and conveying the further hardcopies to the person(s) with whom they wish to share. If later it is desired to share the images with other persons, the same process must typically be repeated. In fact, so much effort and time is required that most users will simply not bother with multiple image sharing.

It has been appreciated that users can conveniently distribute multiple image copies in little time, by scanning the hardcopy image on a home scanner to generate corresponding digital image signals, and then forwarding one or more copies of the digital image signal to others by means of electronic mail (such as over the Internet). Furthermore, the recent advent of services such as KODAK PICTURE DISK available from Eastman Kodak Company and many processors, which allows a user to obtain a digital image signal of images of processed film on a disk for a modest price, even eliminates the need for the user to own a scanner. The availability of a digital image signal additionally allows a user to conveniently store, manipulate, and display or print copies of the images as desired at the user's location using conventional computer equipment.

U.S. Pat. No. 5,272,549 discloses a system in which a customer can connect his computer to a remote print or copy center to retrieve digital image signals of the customer's images. Those digital image signals are described as having been obtained on a scanner at the customer's location with the storage media then being shipped to the print or copy center, or obtained on a scanner at the remote print or copy center. Similarly, subsequent U.S. Pat. No. 5,477,353 describes a system in which one or more photographer units can connect to a centralized laboratory unit (containing a film processor, scanner, and printer). The '353 patent system is constructed with the purpose that a given user's films are processed and scanned at one central processing center, each assigned a unique identification code, and retrieved by that user at his remote terminal using the identification code. The retrieved images can then be manipulated by the user and printed at the central processing center.

The systems of the '549 or '353 patents require that all digital image storage media (in the '549 patent) or hardcopy film (in the case of the '353 patent) carrying images from multiple users, must be conveyed to only one central processing center. This is inconvenient and may cause delays in such a system implemented on a country wide basis. Even if the either patent contemplated multiple processing centers (which they do not), a user would still be required to remember which processing center his film was conveyed to, then use his remote terminal to communicate with that specific processing center to merely retrieve the user's digital images.

It would be desirable to provide a system which allows a user to have hardcopy images, obtained from either hardcopies directly provided by a user or from processing a film, scanned at any of many multiple locations, and which allows a user to access the resulting image signals from a remote terminal without having to keep track of which images were scanned at which scanning location so that that scanning location can be contacted for retrieval. It would further be desirable that, in the event of failures in the system, a user is provided with an independent means which a user can use to inquire of the system, the vacation of his image signals. It would further be desirable that such a system allows a user to consistently obtain further desired services, such as forwarding copies of the images to others or obtaining products incorporating the images, without regard to the location at which the images were scanned and without having to make contact with further service providers offering such further services.

SUMMARY OF THE INVENTION

The present invention provides an image handling method, comprising:
 scanning at a scanner station, one or more hardcopy image sets to obtain corresponding image set signals;
 assigning an associated unique identification signal to each image set signal;
 communicating each image set signal and the associated identification signal to a hub station which is remote from the scanner station;
 forwarding an identification corresponding to an identification signal to a terminal which is remote from the hub station and the scanning station, by a route independent of the hub station;
 storing the communicated image set signals and associated identification signals at the hub station.

The present invention further provides an image handling system comprising:
(a) a scanner station having:
 a scanner system which can scan one or more hardcopy image sets to obtain corresponding hardcopy image set signals and which can assign an associated unique identification signal to each set signal;
 a first communication means for communicating each image set signal and the associated identification signal to a remote hub station;
 a printer connected to the scanner system to print the unique identification associated with each image set signal;

(b) a hub station remote from each of the scanner stations, comprising:
   a second communication means to receive the image set signals and their associated identification signals from the scanner system;
   a first storage to store the image set signals and associated identification signals;
   a third communication means for communicating the image set signals and their respective associated identification signals to a terminal remote from each of the scanner stations and the hub station.

In another aspect of the image handling system of the present invention, the above printer is replaced with an identification communication means for communicating (such as by transmission) the unique identification associated with each image set signal to a terminal remote from the scanner station and the hub station, by a route independent of the hub station.

Additionally, the present invention provides a hub station with suitable means for executing each step required by a hub station of the present invention or as described below. Such means is preferably in the form of a digital computer suitably programmed to execute the required steps, or in the form of equivalent hardware, or a combination of both.

The present invention realizes that a system with multiple remote scanning sites and a remote hub station, can conveniently allow a user to have hardcopy images scanned at any of multiple locations, while allowing ready retrieval of scanned images at any remote user terminal without the user tracking the location at which images were scanned. Additionally, the present invention by providing communication of the identification by a route independent of the hub station, allows a user to inquire of the hub station, and the hub station to further inquire of the appropriate scanner station, the location of the image set signal. This is true even where the system has failed to the point of the image set signal and associated identification signal never having been communicated to the hub system. This can be done without the user keeping track of where any given film may have been scanned. Further, when a unique identification signal associated with each scanner location is also used, this particularly facilitates a determination of the source of any failure in the system. In particular, the scanner location which was to communicate the images can be contacted to determine if the scanned images were in fact completely communicated to the hub station and if so, the particulars of such transmission, and to request a re-transmission if necessary. Additionally, the presence of a hub station allows a user to forward copies of the images or have other services for the images, consistently obtained from the same location without having to communicate with other vendors and without regard to the locations at which different images may have been scanned.

BRIEF DESCRIPTION OF THE DRAWINGS

To facilitate understanding, identical reference numerals have been used, where possible, to designate identical elements that are common to the figures.

EMBODIMENTS OF THE INVENTION

In the present invention it will be understood that with reference to components being "remote" from one another, is meant that they will be at least in another building, and often a mile or more (such as 10, 100 or even 1000 miles) apart. A reference to "communication" refers, unless a contrary indication is given, to transfer of a signal. Such transfer can occur, for example, as a transmission of a signal between the sender and receiver, such as may be obtained over a computer network such as the Internet, dedicated communication line, or over a direct dial-up connection such as provided by a telephone line (any of which may include satellite or other non-wired links, in addition to wired and fiber optic links). Thus, "transmission" implies a signal transfer without a physical transfer of a storage means, such as by suitable "connection" (that is, an actual electronic communication link including a direct connection, such as over a telephone or an indirect connection as may occur over the Inernet). In any event, due to the distances typically encountered between-scanning stations, hub station and terminals, there will typically be one or more signal repeaters between the originator of the communication and the receiver. Alternatively, the transfer can occur by the signal being saved on a suitable storage medium (such as magnetic or optical tape or disks) and the storage medium being physically transferred followed by the reading of the signal from the hardcopy at the receiver. A reference to forwarded refers, unless a contrary indication is given, to a transfer of both a signal (that is, a "communication") as well as to other means of transfer, such as the physical transfer of a hardcopy (for example, a suitable medium upon which data, such as alphanumeric characters, corresponding to a signal has been printed).

In the present invention reference is made to scanning of a hardcopy image to obtain a corresponding digital image. Such procedures and equipment for performing scanning, are well known. Typically, a film frame is scanned with a light beam, and the light transmitted through the film is detected, typically as three primary color light intensity signals, and digitized. The digitized values may be formatted to a standard for video display and stored on compact disc magnetic media, or other suitable storage. Such image digitizers take a variety of forms and the various common aspects of film digitizing, particularly line illumination and linear CCD-based digitizers, are described in greater detail in U.S. Pat. No. 5,012,346. Also photographic prints can be digitized using reflection scanners.

Figure 1:
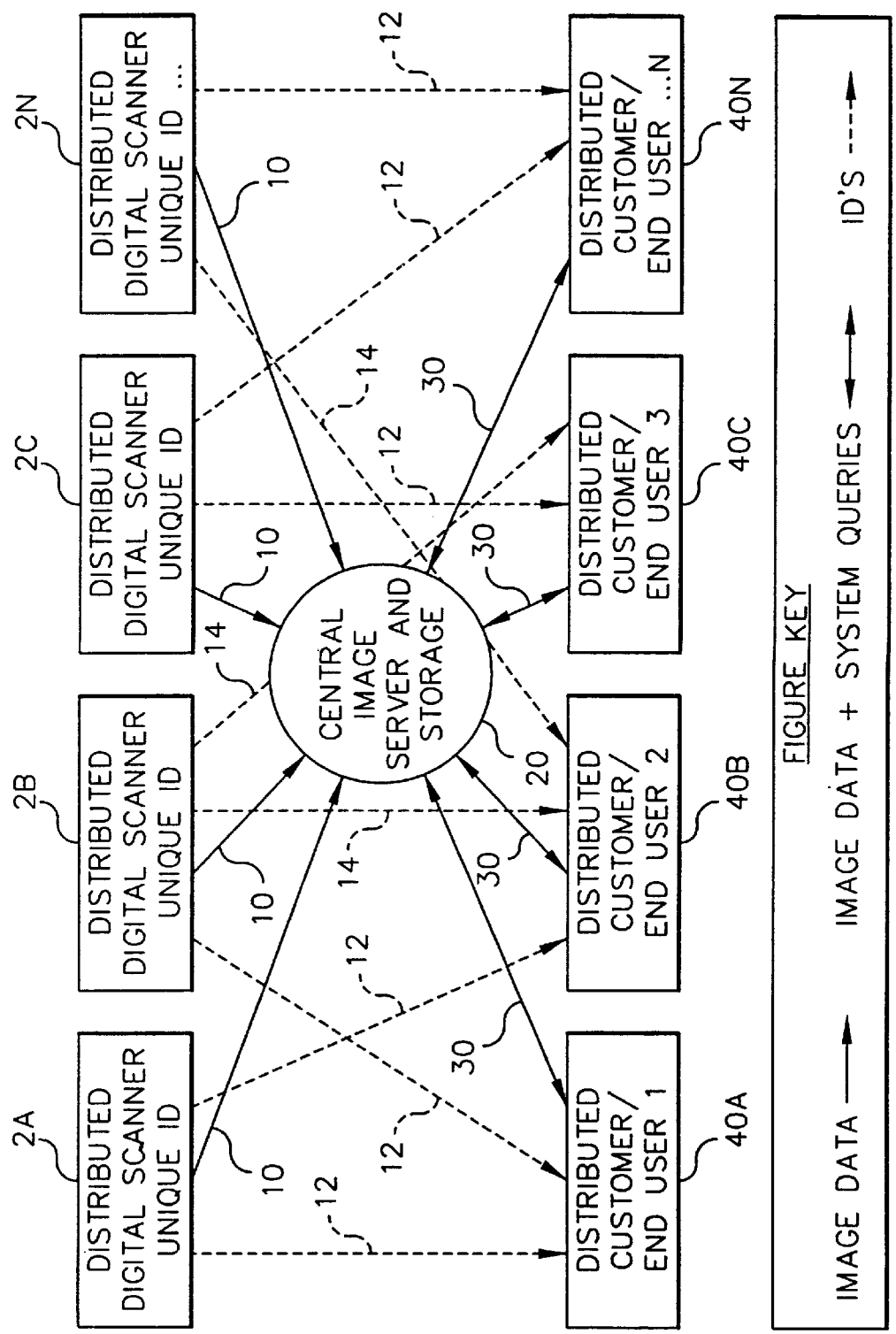
FIG. 1 is block diagram illustrating a system of the present invention.
Figure 2:
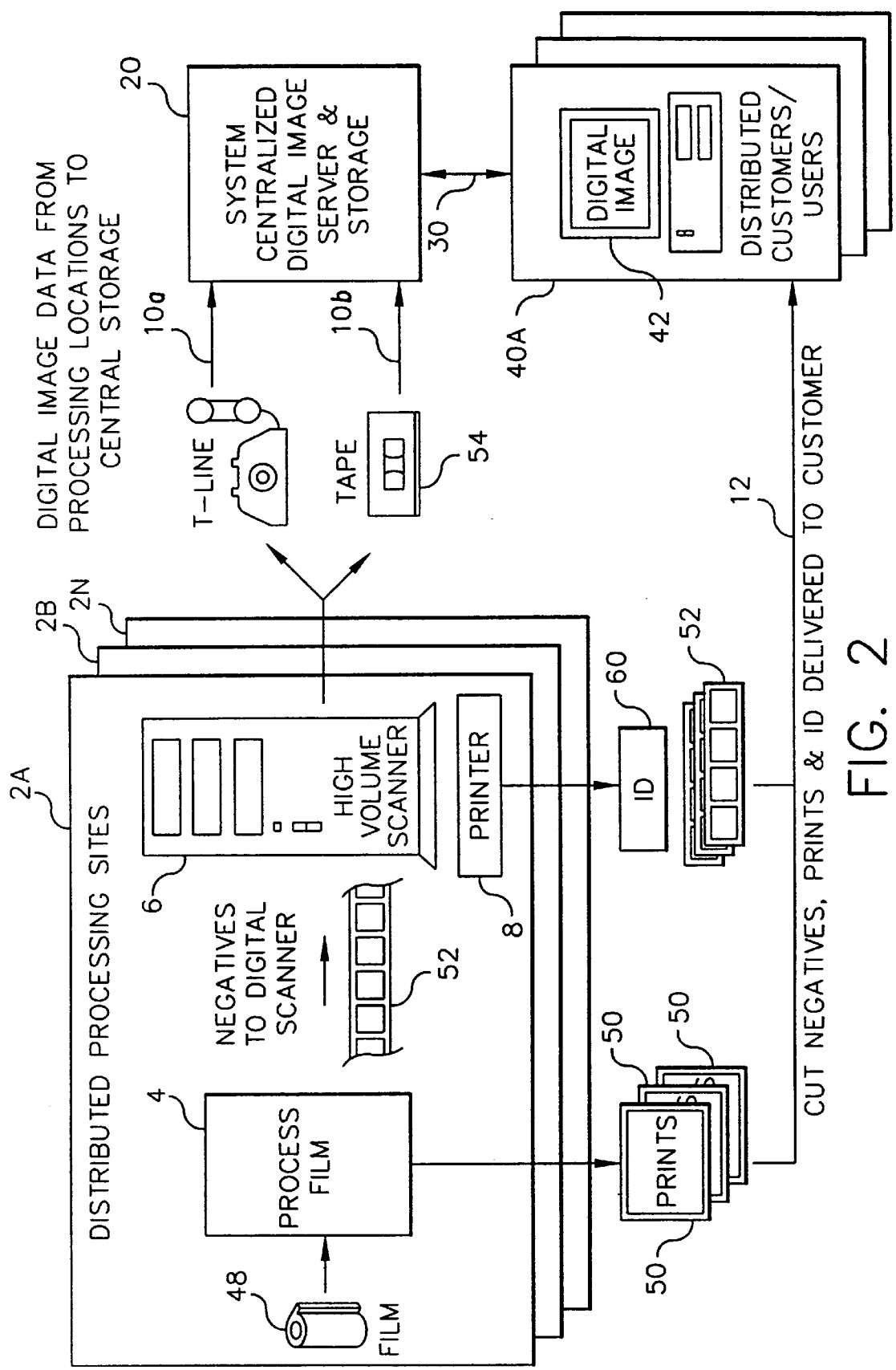
FIG. 2 is a data flow diagram illustrating the operation of some aspects of the system of FIG. 1.

Referring now to the drawings and particularly FIG. 1, the illustrated embodiment of the image handling system of the present invention includes a plurality of scanner stations 2A, 2B, 2C to 2N which are remote from one another, as best seen in FIG. 1. Each scanner station includes a film processor 4 which can process exposed photographic film and produce hardcopy images in the form of both print sets 50 and corresponding negative sets 52 (only one of which is shown in FIG. 2). Negative image set 52 will typically be the developed negative film obtained from exposed film roll 48, while each print set 50 will typically be reflective prints of the negative set 52. However each set 50 and 52 can consist of one or more images.

Each scanner station 2A to 2N further includes a high volume scanner system 6 which includes a suitable scanner for scanning the hardcopy images on each image set 52 to obtain a corresponding digital image set signal. High volume scanner system 6 may be a digital computer in the form of a workstation or desktop computer equipped with a suitable digital scanner for scanning negative set 52. Additionally, each scanner system 6 can assign an associated identification signal to each image set signal so obtained. This assignment may be accomplished by suitable software running on scanner system 6, and is described further below. However, it will be noted at this point that each identification signal is unique in that it includes a scanner location identification which is unique for each scanner station 2A to 2N.

Figure 3:
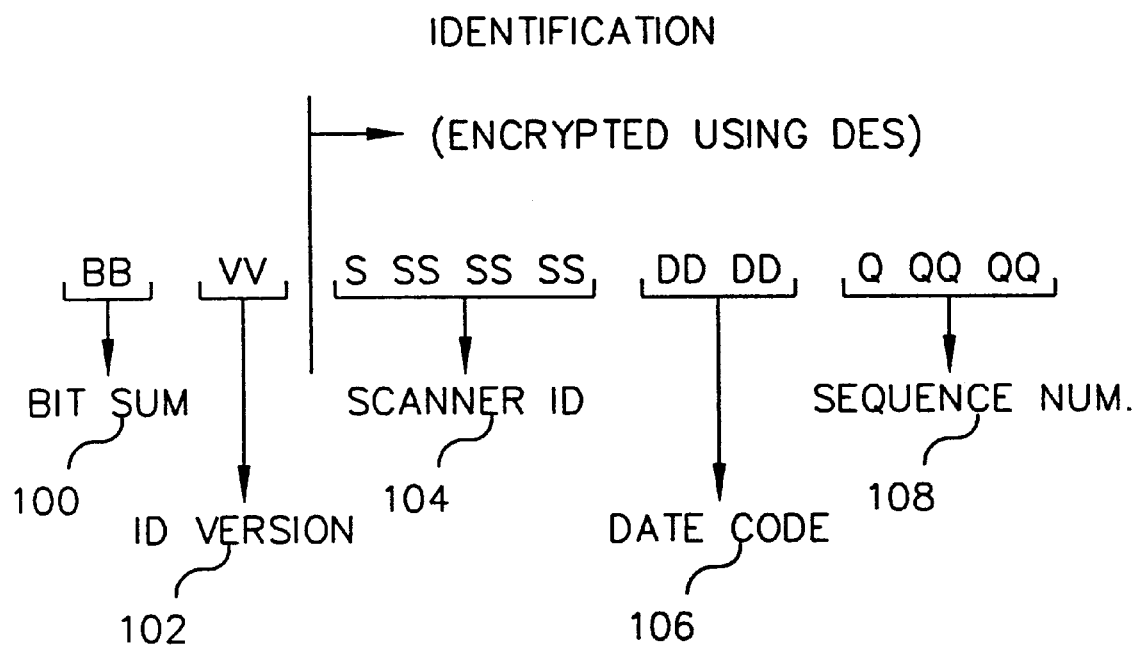
FIG. 3 is a diagram illustrating the components of an identification generated for an associated image set signal.

As to the details of the identification assigned to each associated image set signal, this is shown more fully in FIG. 3. The components of the assigned identification are as follows:

Bit Sum 100: the unsigned sum of the binary identification ("ID") data including ID version, Scanner ID, Date Code and Sequence Number (8 bits binary). The bit sum will be calculated after encryption but prior to conversion to the ASCII representation. The purpose of this Bit Sum is to identify data entry errors without querying the data base of hub station 20 for an associated image set signal.

ID Version 102: revision number of this ID number (8 bits binary). This maps to the encryption key, a new version should accompany any change in the key.

Scanner ID 104, unique identifier for each scanner station 2A to 2N (28 bits binary), which therefore serves as the scanner location identification.

Date Code 106, date a scan of a hardcopy image set began on (16 bits binary—9 bits for day of year and 7 bits for year). Year 0 will be any year in which the system of FIGS. 1 and 2 is first activated.

Sequence Number 108, incremented for each roll scanned within a day (20 bits binary).

The actual ID signal will be created from the binary representation of the Bit Sum 100, ID Version 102, Scanner ID 104, Date Code 106 and Sequence Number 108 as shown below in FIG. 3 (note that the ID Version 102 and Bit Sum 100 must not be encrypted):

The ID, minus the Bit Sum 100 and ID Version 102, will be encrypted prior to conversion to its ASCII form by using DES (Data Encryption Standard) functions with a 56 bit key. DES is described in "Applied Cryptography; Protocols, Algorithms, and Source in C", by Bruce Schneier, 1994, John Wiley & Sons, Inc. The key will be non-obvious and known to the hub station 20 (that is, saved in a storage at hub station 20). The key will be provided to valid scanner sites when the key is changed allowing them to begin producing ID signals encrypted with the new key. This change may be required if an old key has been recognized by someone attempting to claim images which are not theirs. A change to the key will map to a new ID version and this association will be kept at hub station 20. The ID Version 102 facilitates the decryption process by associating the key used to encrypt a given ID Version with a non-encrypted portion of that ID. This will allow the ID to be decrypted and its component parts associated with a roll when it is loaded (that is, saved) by the hub station 20. The ID will result in an audit trail for all digital image sets loaded by the central hub station 20. This audit trail can be used by hub station 20 to respond to end user queries about the status of the digital image sets, as described below.

The ID will be presented to the user (such as by printing a hardcopy) as 16 case insensitive alphanumeric ASCII typeable characters (i.e. 10 byte binary ID represented in base 32 using 0–9 and Aa–Vv where 0=0, 1=1, . . . ,Aa=10, . . . ,Vv=31).

As can be seen from the above, the non-encrypted ID is incremented for each film roll received at a given scanner station. If nothing further was done to the ID, a malicious user at a remote terminal could simply increment a received ID and thereby access another's digital image set. However, due to the encryption of the ID as described above, the resulting encrypted identifications for a series of different film rolls sequentially scanned at the same location, no longer bear the same sequential relationship as the non-encrypted identifications. In fact, the encrypted indentification for one film roll in such a series cannot be determined from the encrypted identification of another roll, without knowledge of the encryption or decryption algorithm. The presence—of the non-encrypted bit sum 100 (sometimes referenced as a "checksum") makes it even more difficult to falsify an ID.

Each scanner station 2A to 2N further includes a first communication means to communicate each image set signal and its associated identification signal to a remote hub station 20, which is part of the image handling system. This communication is illustrated as communication link 10 in FIG. 1. The first communication means may be in the form of a modem (not shown) in scanner system 6, which communicates each image set signal and associated identification over a link in the form of a connection 10*a* to the hub station 20, such as telephone circuit shown in FIG. 2. However, the first communication means could be a modem or communication card which communicates with hub station 20 over a different type of connection, such as a dedicated line connection or a network (such as the Internet). Of course, the various scanner stations 2A to 2N in FIG. 1 may use different first communication means, and therefore the various links 10 shown in FIG. 1 may be the same, or a combination of connections or physical transfer links, one or more of which may be active at any given time (depending upon how many scanner stations are communicating image set signals and associated identifications to hub station 20 at any given time). It will be appreciated that more than one scanner station 2A to 2N may typically be in communication (such as by connection) with hub station 20 at any given time.

Alternatively, as shown in FIG. 2, the first communication means can be in the form of a tape storage in scanner system 6, which stores the digital image signal sets and-associated identification signals on a data tape 54 which is physically transferred (as illustrated by physical transfer link 10*b* in FIG. 2) to hub station 20. In this case the link 10 is a corresponding physical transfer link 10*b* as shown in FIG. 2. It will be appreciated, of course, that tape 54 could be replaced by any other suitable data storage means, such as optical or magnetic disks.

The scanner system 6 at each scanner station 2A to 2N, further includes a printer 8. Printer 8 is connected to scanner station 6 so as to print out a hardcopy series of characters (shown as hardcopy identification 60 in FIG. 2) corresponding to each identification signal.

The single hub station 20 may particularly be a digital computer, such as a workstation, minicomputer or mainframe computer, suitably programmed to execute the steps of the method of the present invention required of hub station 20. Hub station 20 includes a second communication means to receive image set signals and their associated identification signals from each of the scanner stations 2A to 2N. The second communication means may be a modem or suitable communication card (not shown) in the hub station for the case where any of scanner stations 2A to 2N will connect by a link such as connection 10*a* of FIG. 2, or may be a reading device (not shown) which can read a storage medium physically conveyed to hub station 20 when such a communication means is used by any of scanner stations 2A to 2N. Of course, hub station 20 may have both such types of second communication means to accommodate the different types of communication means used by different scanner stations 2A to 2N.

Hub station 20 further has a first storage device to store the received image set signals and their associated identification signals. Such storage device may be any suitable writeable magnetic or optical media (such as one or more hard disks or magnetic tape or optical disks or tape). A second storage, which may or may not be the same physical device as the first storage device, contains directory data correlating each scanner location identification with a scanner address (such as a conventional mailing address or e-mail address).

Hub station 20 additionally has a third communication means for communicating stored image set signals to any of a plurality of terminals 40A, 40B, 40C to 40N connected to hub 20. Such connection is illustrated as connections 30 in FIG. 1, and may, for example, be a network connection, dedicated data line connection, or telephone system connection. Preferably, one or more of the connections 30 will be network connections using the Internet. It will be appreciated that the second and third communication means can be the same physical element, such as a suitable communication program operating through a modem card with one or more telephone connections, when at least one of the scanner stations 2A to 2N communicates with hub station 20 using a connection in the same manner as at least one remote terminal 40A to 40N. Each of remote terminals 40A to 40N may also be any digital computer 42 with appropriate communication hardware and software to engage in two-way communication with hub station 20 over connections 30. The presence of such suitable hardware and software will be understood from each of the terminals 40A to 40N being "connected to communicate" with hub station 20. One or more remote terminals 40A may be connected to hub station 20 at any given time.

It will be appreciated that additional means for communicating image signals to hub station 20 can also be provided. For example, such additional means can include a digital camera which communicates a digital image to hub station 20, such as by a transmission over a network or telephone connection.

Methods of the present invention which are executed on the system of FIGS. 1 and 2 will now be described. First, the user will deposit their undeveloped exposed film 48 at any one of the scanning stations 2A to 2N which the user finds most convenient. At the selected scanning station the user requests the type of processing and hardcopy images (for example, just negatives or additionally, reflective prints) desired and requests that an image set signal corresponding to the image set on film 48 be produced. These requests are made by checking appropriate boxes on a film processing envelope into which film 48 will be deposited. Film 48 will be processed (that is, chemically processed to yield a permanent image) to generate a corresponding negative set 52 and a corresponding print set 50. Different negative sets 52 from different corresponding films 48, will be batched together with negative sets from other orders requesting the scanning service and the batch will be scanned using high volume scanner system 6. As described earlier, each scanner system 6 will generate from each negative set 52, a corresponding digital image set signal and will also generate an associated identification signal for each image set signal. The identification signal includes a unique scanner location identification as discussed above, and in more detail below.

The image set signal can be in any suitable format that will be acceptable to hub station 20, such as TIFF, JFIF, BMP, PICT, GIF, PhotoCD or particularly the recently announced FlashPix format.

A FlashPix file contains the complete image plus a hierarchy of several lower-resolution copies within the same file. This makes a FlashPix file function like a small file when users want it and like big file when users need it. The FlashPix file tructure employs Microsoft Corporation's OLE tructured storage format, which holds image data and elated descriptive information in a standardized "wrapper." The FlashPix format also records edits to an image as small scripts called "viewing parameters." Edits are applied to high-resolution images only when necessary—usually when users want high-quality output. The FlashPix format supports two clearly and completely defined color space options—a calibrated RGB color space definition and Photo YCC. The color space options are built directly into the file format. Optional JPEG compression, along with a single-color compression option where appropriate, is also provided. Further details of the FlashPix file format are available from Eastman Kodak Company, Rochester, NY.

Each print set 50, corresponding negative set 52, and associated identification, are forwarded to the end user (and hence, forwarded to a remote terminal when the user accesses such a remote terminal) by a route which is independent of hub station 20 (that is, this delivery to the end user does not go through hub station 20). Such independent routes 14 are indicated by the lines shown in FIG. 1. In the case of the identification, this may consist simply of printing the identification associated with a given image set signal (and hence associated with the corresponding image set 52, 50 and film 48) with printer 8 and forwarding that printed identification with the associated hardcopy image sets 50, 52, to the user who deposited the associated film roll 48. This forwarding can simply be handing the print set 50, corresponding negative set 52 and associated printed identification 60 the user, or sending it to the user by some other means, such as conventional mail or courier. Alternatively, other routes independent of hub station 20 can be used as forwarding routes 12. For example, the identification could be communicated to the user by electronic mail, facsimile transmission or some other means.

It is possible that, alternatively or additionally, the identification associated with a given film roll 48 could be communicated to the user through hub station 20, such as by an electronic communication (such as electronic mail through a connection such as the Internet). Such an electronic communication of the identification could simply be the same electronic communication of the identification communicated to hub station 20 along with the associated image set signal. Hub station 20 could then communicate the identification to a corresponding terminal 40A to 40N when the user communicates with (that is, logs onto) hub station 20. Such forwarding routes are indicated as forwarding routes 14. However, such a route is less desirable than routes 12 which are independent of hub station 20. This is because if hub station 20 does not receive the communicated image set signal and associated identification from the scanner station at which the film roll 48 was scanned, the user does not have the identification available to her to use in determining why the associated image set signal is not available at hub station 20.

The digital image signal set corresponding to a customer's film roll 48 and an associated identification signal, can be communicated to hub station 20 by a connection 10a or a physical transfer 10b of a signal storage medium such as a magnetic tape 54 as shown in FIG. 2 and discussed above. Hub station 20 receives each digital image set and its associated identification signal communicated from each scanner station 2A to 2N in the first storage means. The identification signal is decrypted and each image set signal can be stored in the first storage and indexed by the decrypted identification.

The user will be able to attempt to access the digital image set corresponding to film roll 48 as soon as they receive the identification, by using any remote terminal, such as remote terminal 40A to connect to and communicate with hub station 20 by a connection 30. At that time, the user simply enters the identification and over the connection successfully completes a user registration process at hub station 20. The identification will allow the user to inquire of hub system 20 as to the location and status of the digital image set signal corresponding to the identification (and film roll 48). Hub station 20 decrypts the identification entered by the user, and can search its index for a saved digital image of predetermined characteristics associated with the decrypted identification entered by the user. By "predetermined characteristics" in this case, is referenced any suitable predetermined characteristics determined by the operator of the system. For example, hub station 20 may be set such that any image set signal received will be stored and indexed with its associated identification signal. Alternatively, the "predetermined characteristics" could be set so that only a complete image set is so stored, or incomplete image sets (such as might result from an interruption of a connection between a scanner station 2A to 2N and hub station 20, or from corrupted data) or digital image sets in a format not accepted by hub 20, may be stored but are identified as not meeting the predetermined characteristics (for example, they are stored with an associated identification indicating incomplete or corrupted data, or a data format not supported by hub station 20).

If such a digital image set of predetermined characteristics exists, one or more of the images in the set may be communicated to the user at remote terminal 40A, or forwarded to another of the connected remote terminals 40B to 40N, as instructed by the user. In the latter case, this would amount to the user forwarding one or more copies of the digital image as desired. The user may then edit or print the images as desired, and may further communicate the edited image back to hub station 20 for storage in addition to or instead of, the original unaltered digital image. Furthermore, hub station 20 could be programmed to transmit to the user at a remote terminal, either upon request or automatically (in the form of advertising), details of services that can be requested from hub station 20. Such services may include various sized prints of an original or edited image stored at hub station 20 (either as prints by themselves, or with accompanying text or graphics, such as embodying the image in a greeting card), or the incorporation of one or more original or edited images onto a product, such as an article of clothing or other useful articles (for example, cups or plates). For this purpose, hub station 20 may communicate (preferably by transmission) the image signal and accompanying instructions, text, and/or graphics, to one or more printers (not shown) or other locations (not shown) at which the user's request may be fulfilled. Such printers or other locations may or may not be remote from hub station 20.

As mentioned digital image data may be lost in transit from a scanner station to hub station 20, an error may occur during the loading of the digital image data to the hub station 20, the image quality may be poor, or some other problem may result in hub station 20 not storing the digital image set associated with the identification entered by the user.

If a digital image set of predetermined characteristics is not stored at hub station 20, different procedures can be used to inquire as to the whereabouts of such digital image set. For example, the date indication of the identification entered by the user can be compared with the current date. If the difference between the date identification of the entered identification and the current date is less than a tolerance predetermined by the user (for example, less than 5 days), hub station 20 may communicate a second message to the user at the remote terminal 40A stating that insufficient time has been allowed for receipt of the scanned image set, and to check again later. Additionally, hub station 20 could indicate to the user upon such an inquiry that an electronic mail message will be sent from hub station 20 to the electronic mail address of terminal 40A within an additional predetermined number of days (for example 10) when a digital image set associated with that identification is received at hub station 20, or by the end of that additional predetermined period if no such digital image set is received. Hub station 20 can then index the additional predetermined date and automatically send the foregoing messages when, or if no, digital image set associated with the identification is received at hub station 20 by the predetermined date.

If the difference between the two dates exceeds-the predetermined tolerance, hub station 20 can then determine from the directory database in the second storage, the scanner address associated with the user entered identification. In the particular example above, this would be scanner 2A. Hub station 20 can then forward a first message in the form of an inquiry to the determined scanner address to inquire as to the particulars of the communication of the digital image set associated with that identification, or in the form of a request to repeat the communication if possible (for example, where the determined scanner station has stored a copy of the digital image set). Hub station 20 can connect to the determined scanner station 2A to deliver the first message as, for example, be an electronic mail message or facsimile, if the scanner station has the capacity to receive such a message. In the case of the electronic message in particular, the scanner stations 2A to 2N may optionally be equipped with a storage which stores particulars of when and how each digital image set and associated identification was communicated to hub station 20. In this case, a scanner station to which an inquiry was sent, could access such particulars of digital image set status and disposition in response to the inquiry, and communicate them to hub station 20 through a connection, for communication to a connected terminal 40A to 40N. Alternatively, the first message can be printed at hub station 20 and forwarded by conventional mail or courier to the determined scanner station such as scanner station 2A.

Of course, the sequences in the foregoing paragraph can optionally be executed upon receipt of a user inquiry, without the described comparing of the difference in the two dates.

It will be appreciated from the above, that the end user is able to drop off multiple film rolls at different ones of the scanner stations 2A to 2N and access the corresponding digital image sets, without ever having to keep track of which film rolls were dropped off at which scanner stations, and access all scanned image sets at the one hub station 20. The use of a route independent of the hub station 20, by which a remote terminal location is provided with identification, allows a user to inquire of hub station 20 the whereabouts of the associated digital image set even though hub station 20 has never previously received such set or any information on it from the scanner stations. Furthermore, the unique scanner location identification aids in then tracing the digital image set.

Figure 4:
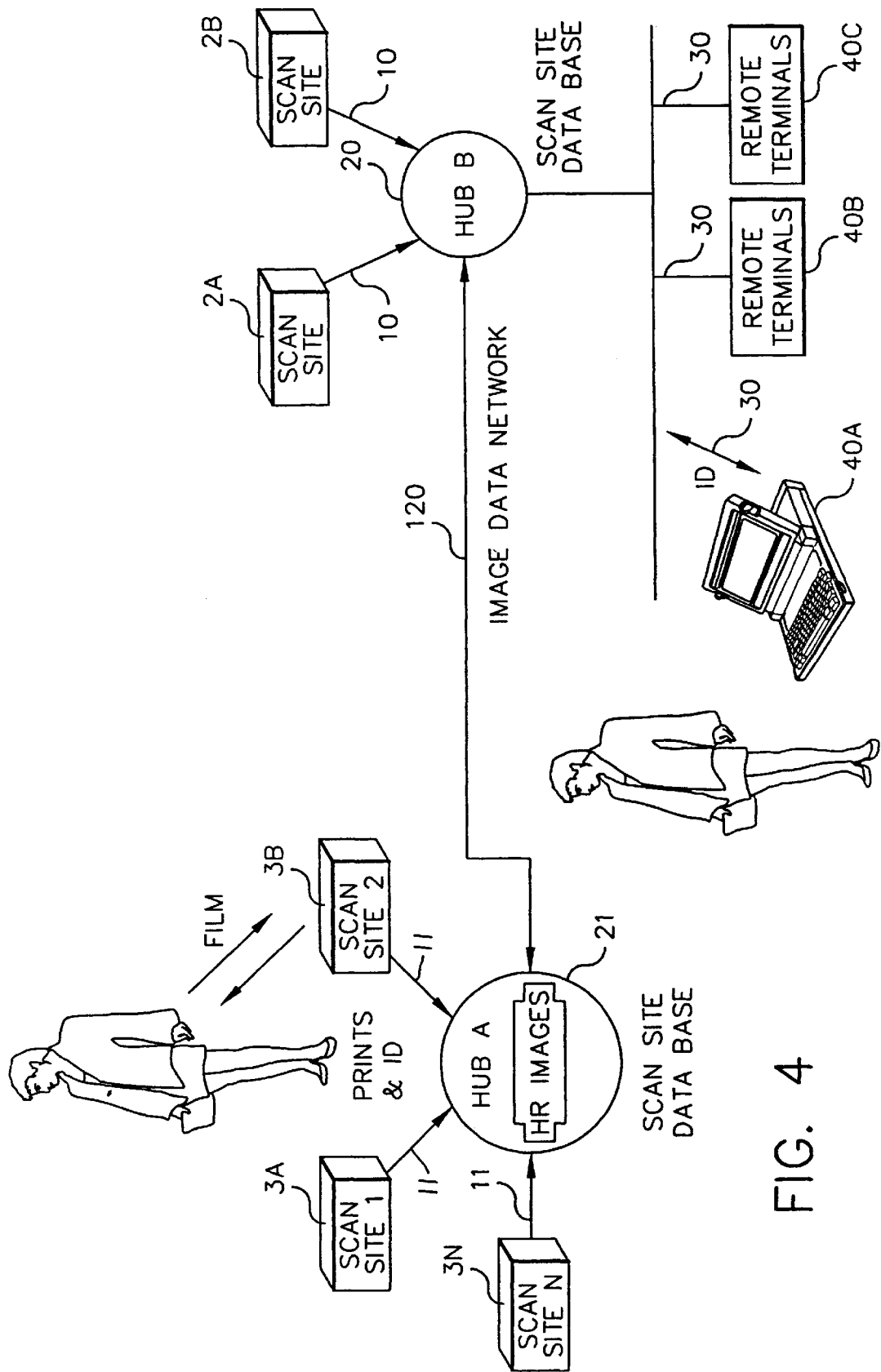
FIG. 4 is a block diagram illustrating a system of FIG. 1 with a further connection of the hub to another hub.

Referring to FIG. 4, there is illustrated the situation where more than one hub is present in the overall system, each hub serving different geographical regions (such as different countries). In FIG. 4, hub station 20 is only shown with scanner stations 2A and 2B communicating therewith, although it will be understood that further scanner stations 2C to 2N can be present. A second hub station 21, which may be the same as hub station 20, is in communication with scanner stations 3A, 3B to 3N, over communication links 11, in any of the manners hub station 20 is in communication with scanner stations 2A to 2N, as described above. A plurality of user terminals (not shown) may further be connected to hub station 21. There may, of course, be a further connections of hub station 20 to other hub stations (not shown) each with their own associated scanner stations and terminals (not shown). Hub station 20 may communicate with each over a data network or other connection, such as hub station 20 communicates with hub station 21 over image data network 120. The communication connection from one hub station to hub station 20 can be through one or more other hub stations or not.

In FIG. 4, each of the multiple hub stations, such as hub station 20 and 21, would have directory data in their respective second storages which correlates each scanner location identification with a scanner address and the address of the hub with which that scanner station normally communicates. With this arrangement, a user can drop off a film for processing and scanning at any scanning station which normally communicates with an associated hub, and automatically retrieve digital images at any terminal by communicating at another hub. As particularly shown in FIG. 4, the user drops off a film for processing and scanning at scanning station 3B. The print set and associated unique identification are returned to the user. Scanner station will communicate the digital image set of that film to hub station 21, with which it is normally associated. When the user attempts to retrieve the digital image set from a terminal 40A connected to hub station 20, hub station 20 will compare the decrypted identification transmitted to it by the user with its directory data and ascertains that the film associated with that identification was scanned at scanner station 3B, which scanner station normally communicates with hub station 21. Hub station 20 will then forward a request to hub station 21 (preferably a transmitted request over network 120) for the associated digital image set to be communicated to hub 20. Preferably this communication occurs also as a transmission from hub 21 to hub 20. In this example then, it will be seen that the communication from scanner station 3B to hub station 20, was an indirect communication through hub station 21.

The invention has been described with reference to a preferred embodiment. However, it will be appreciated that variations and modifications can be effected by a person of ordinary skill in the art without departing from the scope of the invention.

PARTS LIST 2A, 2B, 2C to 2N Scanner Stations
3A, 3B to 3N Scanner Stations
4 Film Processor
6 Scanner System
8 Printer
10, 11 Communication Link
10a Connection
10b Transfer Link
12, 14 Routes
20, 21 Hub Stations
30 Connection
40A, 40B, 40C to 40N Terminals
42 Digital Computer
48 Film Roll
50 Print Sets
52 Negative Set
54 Tape
60 Identification
100 Bit Sum
102 ID Version
104 Scanner ID
106 Data Code
108 Sequence Number
120 Network

What is claimed is:

1. An image handling method, comprising:
providing at least one scanner stations interfaced to at least one remote hub station;
scanning at least one hardcopy image set to obtain a corresponding digital image signal set;
assigning a unique identification signal to each of the digital image signal sets, the unique identification including scanner location identification and frame and roll location embedded within an encrypted data structure; and
retrieving the digital image signal set from a remote terminal via associating the unique identification signal with the digital image set signal.

2. A method according to claim 1 wherein following the step of assigning, the following steps are performed:
communicating each of the digital image signal sets and the associated unique identification to the at least one hub station which is remote from the scanner station;
storing the communicated image set signals and associated unique identification signals at the hub station.

3. A method according to claim 2 wherein the step communicating further comprises determining if the stored digital image signal has predetermined characteristics contained within the encrypted unique identification signal.

4. A method according to claim 3 wherein the step of communicating further comprises step of forwarding a message to the remote terminal indicating no such stored image set signal has been received the digital image signal set of predetermined characteristics associated with the received unique identification signal.

5. A method according to claim 1 wherein the identification forwarded to the remote terminal is communicated to the remote terminal.

6. The method of claim 1 wherein the unique identifier with the encrypted data structure is entered into the remote terminal.

7. The method of claim 6 wherein the step of retrieving further comprises the unique identifier traversing the hub station unthe to arrive at the scanner station.

8. The method according to claim 1 wherein the unique identification is transmitted to the remote terminal.

9. The method according to claim 1 wherein the step of assigning further comprises first printing a hardcopy of the unique identification at the scanner station then delivering the hardcopy of the identification to the remote terminal location.

10. An image handling system comprising:
at least one scanner stations which can scan at least one hardcopy image sets to obtain a digital image set corresponding to the hardcopy image set signals and assign a unique identification signal to each of the digital image sets, the unique identification having an encrypted data structure that contains location for the scanner station as well roll and frame location for each image within the digital image signal set;

a hub station remote from each of the scanner stations;

a first communication means associated with the scanner station for communicating each image set signal and the associated identification signal to at least one remote hub station;

a second communication means associated with the hub station to receive the image set signals and their associated identification signals from the scanner system;

a first storage device to store the image set signals and associated unique identification signals within the hub station; and a third communication means for communicating the image set signals to a remote terminal upon reception of the associated unique identification signals.

11. The system of claim 10 wherein the unique identifier is received from the remote terminal.

12. The system of claim 10 further comprising a printer connected to the scanner system to print the unique identification associated with each image set signal.

13. An image handling system according to claim 10 additionally comprising a plurality of terminals remote from the scanning station and the hub station, connected to communicate with the hub station.

14. The image handling system according to claim 10 wherein the identification communication means transmits the identification signal to the remote terminal.

15. A system according to claim 10 further comprising the hub station being configured to communicate the image signal to any of the following; a printer, a plurality of printers or other remote locations.

* * * * *